United States Patent Office 3,495,945
Patented Feb. 17, 1970

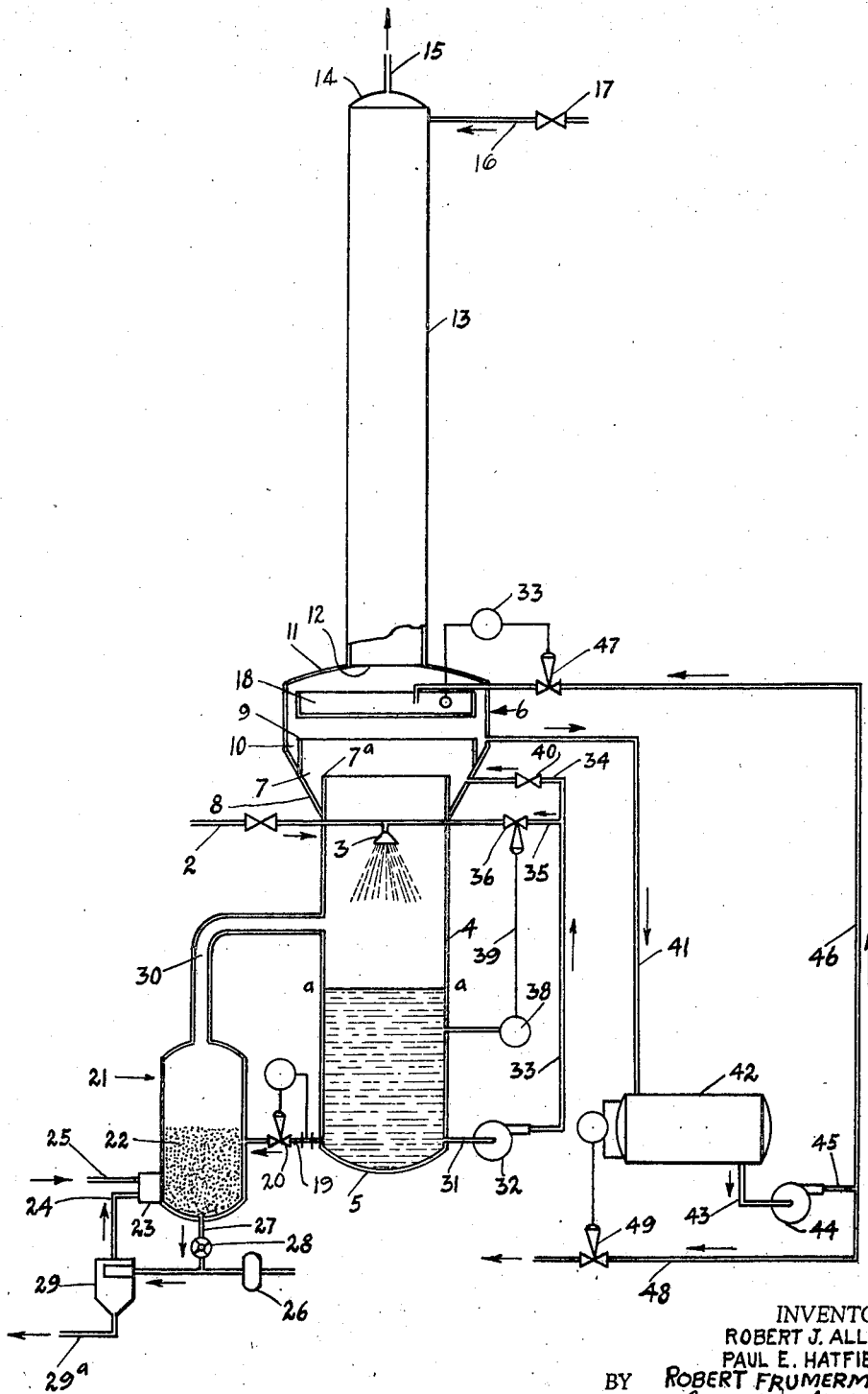

3,495,945
APPARATUS FOR THE REGENERATION OF HYDROCHLORIC ACID FROM SPENT PICKLE LIQUOR AND LIKE SOLUTIONS
Robert J. Allison, Coraopolis, Paul H. Hatfield, Beaver, and Robert Frumerman, Pittsburgh, Pa., assignors to Dravo Corporation, Pittsburgh, Pa., a corporation of Pennsylvania
Filed July 19, 1966, Ser. No. 566,310
Int. Cl. B01d 1/14, 1/16; C01b 7/08
U.S. Cl. 23—260                               5 Claims

ABSTRACT OF THE DISCLOSURE

An apparatus for the regeneration of hydrochloric acid from solutions of metallic chloride and especially from spent industrial pickle liquors. A receptacle is provided with an adjacent convertor having a burner for feeding hot combustion gases to the receptacle, feed means for dispersing spent liquor to the receptacle through the hot gases, and an absorption column atop the receptacle for collecting gases and vapors from the receptacle having a liquid absorbent feed means, a means for venting off gases and means for collecting and withdrawing water and dissolved hydrogen chloride from the column.

This invention relates to the processing of solutions of metallic chlorides for the regeneration of hydrochloric acid and the recovery of metal values therefrom, and is especially useful in the processing of industrial pickle liquor used in the cleaning and descaling of ferrous metal in connection with which it will be herein particularly described.

Hydrochloric acid used in the pickling of steel reacts with the metals, as a result of which iron chloride, $FeCl_2$, accumulates in the solution and the acid concentration is correspondingly reduced. When the acid value is too greatly exhausted, it is ineffective for the pickling operation so that it is withdrawn and replaced by other acid solution. The solution so withdrawn is commonly referred to as "spent solution," even though it may still contain an appreciable amount of unreacted hydrochloric acid. The term "spent pickle liquor" as herein used has application to such solution as has been used to even partial exhaustion, since in continuous operations, make-up acid is continuously supplied as spent solution is withdrawn.

In the copending application Ser. No. 324,479, filed Nov. 18, 1963, now U.S. Patent No. 3,310,435 issued Mar. 21, 1967 of Mr. M. W. Robinson, Jr., et al., assigned to the assignee of this application, there is disclosed a process in which the spent pickle liquor is sprayed into a closed environment into which burning products of combustion are also introduced, and the water in the pickle liquor is evaporated, the iron and chlorine are dissociated, resulting in the formation of iron oxide as $Fe_2O_3$, hydrogen chloride, water vapor; and any unreacted hydrochloric acid is also driven off as hydrogen chloride. These are all mixed with the products of combustion which are continuously carried out of the reactor and first passed through a dust collector, which removes the iron oxide. The gases then enter an absorption column and flow countercurrent to streams or sprays of water to dissolve the hydrochloric acid. This method is referred to as the "spray-roaster" process. One drawback is that the apparatus is quite large, and the oxide is a dust-like powder that is difficult to effectively remove from the gases and unsuitable in that form for use in blast furnace or steel making operations, and presents problems in sintering or pelletizing.

In a copending application of H. W. Flood et al., filed concurrently with this application, now U.S. Patent No. 3,440,009 there is disclosed a process in which the iron oxide is recovered as granule-like agglomerates. This is accomplished by using a fluidized bed reactor operated at a minimum bed temperature of about 1535° F., but use of this method alone is thermally inefficient.

Other processes have also been proposed involving concentration of the liquid, but for various reasons have been unsatisfactory, including the build-up of deposits that impair the proper functioning of the equipment.

The present invention embodies a method and apparatus wherein there is a reactor, such as a spray roaster or fluidized bed, preferably the latter, and the products of combustion and the hot off-gases from the reactor are introduced directly into a preheater and concentrator. This is a closed vessel and the chloride solution or pickle liquor is continuously sprayed or otherwise dispersed into these hot off-gases, thereby preheating it, evaporating a substantial part of the water therefrom, and any hydrogen chloride of the unreacted acid is largely released from solution to mingle with the other gases. The gases and vapors from the preheater and concentrator then pass through an absorber column countercurrent to flowing water, the absorber preferably being at the top of the preheater-concentrator so as to form an upward extension thereof. The pickle liquor after passing in a dispersed state through the hot off-gases from the reactor, is collected at the bottom of the preheater-concentrator unit. According to the preferred arrangement, part of it is recycled to the disperser to mix with fresh liquor being introduced into the preheater-concentrator, part is recycled to a trough at the top of this unit to flow down the interior wall of the unit to wash away any deposit and reduce the wall temperature, and part of the liquid from the bottom of the unit is continuously discharged into the reactor.

With the absorber directly above the preheater-concentrator unit, there is a catch basin to collect the water with absorbed HCl or hydrochloric acid, and the acid so collected overflows into a second annular trough so that the gases rising from the evaporator pass through the acid stream that overflows from the basin into the trough. From the trough the hydrochloric acid is discharged by gravity into a collection vessel. Some of it is recycled to the catch basins, and some of it may be continuously or intermittently withdrawn for metal pickling or such other use as is made of the acid.

If the reactor is a fluidized bed reactor, the metallic oxide which is formed is collected in the bed from which it is withdrawn at a controlled rate, or from time to time.

The invention has for its principal object to provide a novel method of and apparatus for the regeneration of hydrochloric acid from metal chloride solutions, particularly pickle liquor.

A further object of the invention is to provide a method of and apparatus for the regeneration of hydrochloric acid from metal chloride solutions, that may or may not contain free hydrochloric acid, which has a good thermal efficiency.

These and other objects and advantages are secured by our invention which may be more fully understood by reference to the accompanying drawing, wherein:

The figure is a schematic flow diagram, but includes schematically, certain structural features of the preheater and evaporator unit.

Referring to the drawings, 2 designates a supply line through which the metal chloride solution, such as spent hydrochloric acid pickle liquor from the pickling of ferrous metal, is supplied (either continuously or intermittently as conditions may require) to a disperser such as spray device 3 in a closed environment comprising a tank-like vessel 4 having a bottom 5. The upper end of the tank extends upwardly into a hood 6 of larger diameter than the tank, thereby forming an annular trough 7 between the upwardly-projecting end of the tank and the inwardly-sloping wall 8 of the hood, the bottom of the sloping wall being attached to the exterior of the tank. Fixed on the sloping wall 8 concentric with the trough 7 is a vertical wall 9 forming a second annular trough 10 inside the hood.

The hood has a cylindrical side wall extending upwardly from the outer edge of the sloped bottom 8 at the top of which is dome 11. This dome has a central opening 12. This opening is at the bottom of a vertically-extending absorption column 13. This column has a closed top 14 with a gas outlet 15. A water supply pipe 16 is provided at the upper end of the column through which water is introduced into the column continuously during operation at a controlled rate of flow, a control valve being indicated at 17. The column is of a known construction used to bring liquid and gas into intimate countercurrent contact. It may contain a packing of Raschig rings, Berl saddles, or the like, or it may have vertically-spaced bubble cap plates, perforated plates, or lens plates therein, all of which are known in the art.

There is a catch basin 18 under the dome centered below the opening 12 and extending laterally over the trough 10, so that overflow from the basin will be collected in the trough 10.

At the bottom of the tank 4 there is an outlet pipe 19 with a flow control valve 20 therein through which liquid flows from the vessel 4 into a reactor or converter unit 21 which the liquqid is vaporized, the metal chloride dissociated by heat, and there is produced hydrogen chloride, metal oxide and water vapor. This may be a spray reactor as disclosed, for example, in Robinson et al., Patent U.S. 3,310,435, or a fluidized bed reactor as disclosed in Flood et al., Patent U.S. 3,440,009. Preferably the converter is a fluid bed reactor because the iron oxide from this reactor is in the form of agglomerated granule-like particles, relatively free of dust, and such a unit has been indicated in the drawing.

This fluidized bed reactor comprises an enclosed vessel in which is a bed 22 of inert material, preferably metallic oxide which, after a period of operation, eventually is iron oxide produced in the reactor. A burner 23 near the base of the vessel has an air supply pipe 24 and a fluid fuel supply pipe 25 for supplying gas or oil. Alternatively, combustion may be effected in the fluidized bed itself. A blower 26 forces air under pressure into the pipe 24 and the products of combustion entering the bed of inert material, which may be iron oxide where pickle liquor is being processed, and fluidizes the bed in a manner well understood in the art. Typically the bed is operated at a temperature of 1535° F. or above, but below the temperature where the inert material fuses. The liquid entering the heated bed vaporizes and in the presence of the hot combustion gases the reactions above referred to take place. Normally the iron oxide which is produced remains in the bed and may be removed through a bottom discharge pipe 27 with a gas lock 28. As here shown pipe 27 connects into the air supply line 24 between the blower and the burner with a cyclone dust collector 29 being located in this line in advance of the burner. In this manner the thermal efficiency is improved by using the heat energy available in the product oxide to preheat combustion air.

The gases and vapors above the fluidized bed are at a high temperature, substantially higher than the boiling point of water, and these gases are conducted through a short duct 30 into the vessel 4 below the level of the disperser 3, so that the mist or spray from the disperser 3 discharges directly into a high temperature atmosphere. This serves to evaporate water from the solution introduced through the dispersing means, release unreacted hydrogen chloride in the solution, and reduce the temperature of the reactor gases.

There is a second outlet pipe, 31, at the lower portion of the vessel 4 which leads to a pump 32. The pump discharges into a line 33 that has two branches 34 and 35. Branch line 34 discharges into annular trough 7 at the lower part of the hood and the branch 35 has an automatic flow control valve 36 for circulating liquid back into the sprayer or other dispersing means 3.

Liquid level is maintained in the vessel 4 at about the level of line a—a and there is a specific gravity monitoring device 38 of a well-known type that controls valve 36 pneumatically or electrically as indicated by line 39, to relate the flow of liquid from the pump 32 into the dispersing means according to the specific gravity of the concentrated liquid in the vessel 4. There is also a flow regulating valve 40 in branch line 34 which can be adjusted to keep a constant overflow from the trough 7 down the inside walls of the evaporator-preheater unit.

From the annular trough 10 there is a hydrochloric acid withdrawal pipe 41 leading to a collection tank 42. From this tank there is an outlet 43 leading to a pump 44 discharges through pipe 45 to a branched line that has one branch 46 leading to the catch basin 18. There is a conventional liquid level control valve 47 in branch line 46 to regulate the flow of recycled hydrochloric acid to this basin. The other branch 48 into which pump 44 discharges is a hydrochloric acid discharge line through which regenerated hydrochloric acid is withdrawn from the apparatus for use. A liquid level controlled valve 49 controls the discharge through line 48 to maintain a controlled depth of liquid in the vessel 42.

In operation, combustion gases, steam and vapors from the vessel 4 rise into the dome at the top of this vessel, passing up around the catch basin 18. They rise through the absorption column 13 against the countercurrent flow of water down the column from pipe 16. Uncondensed gases and steam are exhausted through the offtake pipe 15 at the top of the column. The hydrogen chloride vapor in the inlet gases is absorbed by the water while the steam is also condensed. The resulting solution falls into the catch basins 18 and overflows around the periphery of this basin into the annular trough 10 so that the rising gases passing upwardly pass through a falling curtain of hydrochloric acid. The hydrochloric acid from the trough 10 is withdrawn through the pipe 41 into the vessel 42 and some of it is recycled through the pipe 46 back to the catch basin to maintain a substantially uniform overflow of hydrochloric acid from the catch basin into the trough 10 and incidentally effect a concentration of the acid.

The chloride solution entering the system through pipe 2 is discharged into the environment within the vessel 4 through the disperser 3 and the discharge in the form of droplets passes through the atmosphere of hot gases from the converter 21, be it either a fluidized bed converter or a spray reactor as above described. In passing through the atmosphere of hot gases the incoming liquid is preheated and concentrated by the evaporation of water and hydrogen chloride. The preheated concentrated liquid collects in the lower part of the vessel 4. Part of this liquid is recycled by pump 32 and line 33 to the disperser when the valve 36 is open. The volume of fluid recycled in this way is controlled by the specific gravity controller 38 which provides for recirculation of the liquid as long as the specific gravity is below a desired minimum. Other liquid removed from the bottom of the vessel 4 and circulated by the pump 32 flows into the annular trough 7, flowing continuously over the weir 7a. This liquid which flows down the interior walls of the vessel 4 serves to keep these walls fairly cool. Thus it serves to conserve heat, but more importantly prevents a build-up of solids on these walls.

Concentrated liquid flows from the bottom of the vessel 4 into the reactor, the flow of liquid being regulated to maintain a substantially constant level of liquid in the vessel 4 and regulate the rate of dscharge of liquid into the fluid bed or other reactor. As above stated, the reactor in the case of a fluidized bed is desirably operated with the bed at a temperature of around 830° C.

In the case of pickle liquor from the pickling of steel, iron oxide is produced in the reactor or converter. This is collected in the fluidized bed and discharged into the cyclone 29 and is removed through outlet pipe 29a.

The liquid which overflows the weir 7a and flows down the interior of the vessel 5 is, of course, further heated and further conecntrated as is the liquid that is recycled through the disperser 3.

By concentrating and preheating the chloride solution or pickle liquor inside the vessel 4, the volume of water that must be vaporized in the converter 21 is very much less than would be the case where this concentration is not effected. The thermal efficiency of the apparatus is high because the heated gases from the converter are used to preheat the feed liquid and concentrate it. By having the absorption column 13 extending upwardly from the preheater and concentrator 4, duct work is kept to a minimum and heat losses are reduced. Using a fluidized bed as a converter and operating it at the temperature indicated, there is practically no iron oxide in the effluent gases. Should there be any such oxide, it would be largely trapped in the spray discharge in the vessel 4 and the recirculated liquid coming down the walls of the vessel 4, and eventually carried back into the converter.

In a typical example, with a continuous pickling apparatus for the pickling of sheet steel at 100 tons per hour and a pickup of ½% of Fe in pickling, the pickling liquor withdrawn at the rate of 7828 lbs. per hour has the following approximate analysis.

| | Pounds |
|---|---|
| $Fe_2Cl$ | 2270 |
| HCl | 78 |
| $H_2O$ | 5480 |

It is introduced into the preheater and evaporator at a temperature of about 160° F. Fuel as natural gas is introduced into the fluidized bed at the rate of 977 lbs. per hour with air at the rate of about 18,300 lbs. per hour. With the air temperature at 60° F., it is preheated by contact with the product oxide from the fuel bed to approximately 150° F. The gases leaving the converter have a temperature of about 1535° F. and have the following approximate analysis:

| | Pounds |
|---|---|
| HCl | 1386 |
| $H_2O$ | 7378 |
| $CO_2$ | 2600 |
| $N_2$ | 14,033 |
| $O_2$ | 281 |
| Total | 25,678 |

The fluid bed yields about 1424 lbs. of $Fe_2O_3$. The temperature of the liquid feed from the preheater and concentrator is about 194° F.

Water at 60° F. is introduced into the absorber at the rate of 16,122 lbs. per hour and the off-gases have approximately the following analysis at a discharge temperature of about 188° F.

| | Pounds |
|---|---|
| $H_2O$ | 17,960 |
| $CO_2$ | 2,600 |
| $N_2$ | 14,033 |
| $O_2$ | 281 |

The hydrochloric acid yield is 6926 pounds per hour with 1386 pounds of HCl to 5540 pounds of water.

The foregoing example is based partly on actual results and is partly theoretical based on results achieved in spray roasting equipment but is believed to be sufficiently accurate to enable one skilled in this art to practice the method.

While we have shown one preferred form of apparatus for the practice of our invention, it will be understood that this apparatus may be variously arranged and organized within the contemplation of our invention and under the scope of the following claims.

We claim:

1. Apparatus for regenerating hydrochloric acid from a solution carrying a metal chloride comprising:
   (1) a converter having a burner for generating hot combustion gases therein,
   (2) a receptacle into which hot gases and vapors from the converter are conducted, said receptacle being open at its top,
   (3) a duct connecting said converter to said receptacle for transferring said gases and vapors from said converter to said receptacle,
   (4) means for feeding said solution to said receptacle at a point disposed above the connecting point of the duct with the receptacle,
   (5) dispersing means within the receptacle and connecting to said feeding means for introducing the solution in a dispersed state into the hot gases and vapors in the receptacle to preheat the solution and effect removal of water therefrom,
   (6) means for feeding solution from the receptacle to the converter,
   (7) a gas conducting dome of larger diameter than said receptacle positioned directly on top of the receptacle, said dome being open at its top,
   (8) an absorption column open at its bottom and positioned directly on top of said dome in gas conducting relation thereto, whereby gases and vapors from said receptacle flow into said dome and then into said absorption column,
   (9) means for introducing liquid absorbent into the top of the column,
   (10) means at the top of the column for venting uncondensed gases,
   (11) a catch basin of smaller diameter than said dome and positioned within the dome directly below the absorption column for collecting water with hydrogen chloride dissolved therein,
   (12) means in the dome below the catch basin forming a first annular trough over which the periphery of the catch basin extends, whereby overflow from the catch basin is caught in said first trough while gases flow from the receptacle upwardly around the catch basin to the absorption column, and
   (13) means for discharging liquid from said first trough directly to the outside of said dome.

2. Apparatus for regenerating hydrochloric acid as defined in claim 1, further comprising means in the dome forming a second annular trough around the top of said receptacle for overflowing liquid from within the second annular trough onto the walls of said receptacle to wash down said walls, said second annular trough being concentric with, positioned below, and of smaller diameter than said first annular trough so as to be disposed to receive overflow from said first annular trough, and means for withdrawing liquid from the bottom of the receptacle and recycling said liquid to said second annular trough.

3. Apparatus for regenerating hydrochloric acid as defined in claim 1, further comprising a storage vesel adjacent said receptacle and connected to said means for discharging liquid from said first trough, means for withdrawing liquid from said storage vessel and returning it to said catch basin, and means for withdrawing liquid as a usable product from said storage vessel.

4. Apparatus for regenerating hydrochloric acid as defined in claim 1 wherein means is provided for recycling solution from the bottom of the receptacle to said dispersing means.

5. Apparatus for regenerating hydrochloric acid as defined in claim 4, further comprising a specific gravity control means adjacent the receptacle and operative to measure the specific gravity of liquid in the receptacle, for regulating the recycle of solution to the dispersing means.

References Cited

UNITED STATES PATENTS

| | | | |
|---|---|---|---|
| 1,493,579 | 5/1924 | Walter | 261—117 |
| 1,971,798 | 8/1934 | Shoeld | 23—260 XR |
| 2,478,741 | 8/1949 | Brothman | 23—260 XR |
| 2,646,345 | 7/1953 | Otto | 23—260 |
| 2,950,180 | 8/1960 | Kunzer et al. | 23—154 XR |
| 2,966,394 | 12/1960 | Van Ackeren | 23—260 XR |
| 3,085,860 | 4/1963 | Jacobowsky et al. | 23—154 XR |
| 3,233,978 | 2/1966 | Alkemade | 23—154 XR |
| 3,310,435 | 3/1967 | Robinson et al. | 23—154 XR |
| 3,399,964 | 9/1968 | Michels et al. | 23—154 |

FOREIGN PATENTS

| | | |
|---|---|---|
| 539,932 | 9/1941 | Great Britain. |
| 956,608 | 4/1964 | Great Britain. |
| 282,364 | 6/1965 | Australia. |

MORRIS O. WOLK, Primary Examiner

JOSEPH T. ZATARGA, Assistant Examiner

U.S. Cl. X.R.

23—154; 55—228; 261—110, 117